UNITED STATES PATENT OFFICE.

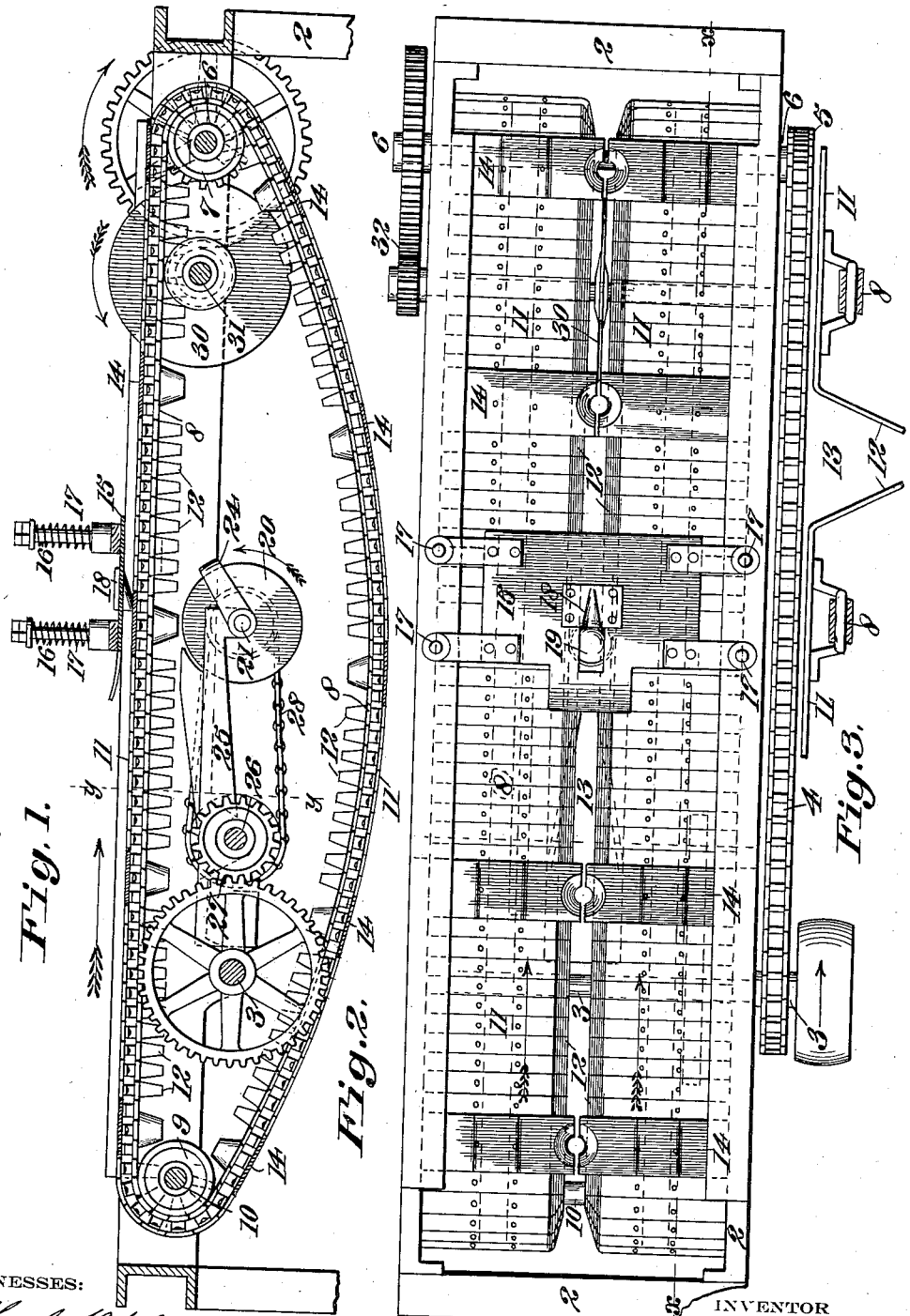

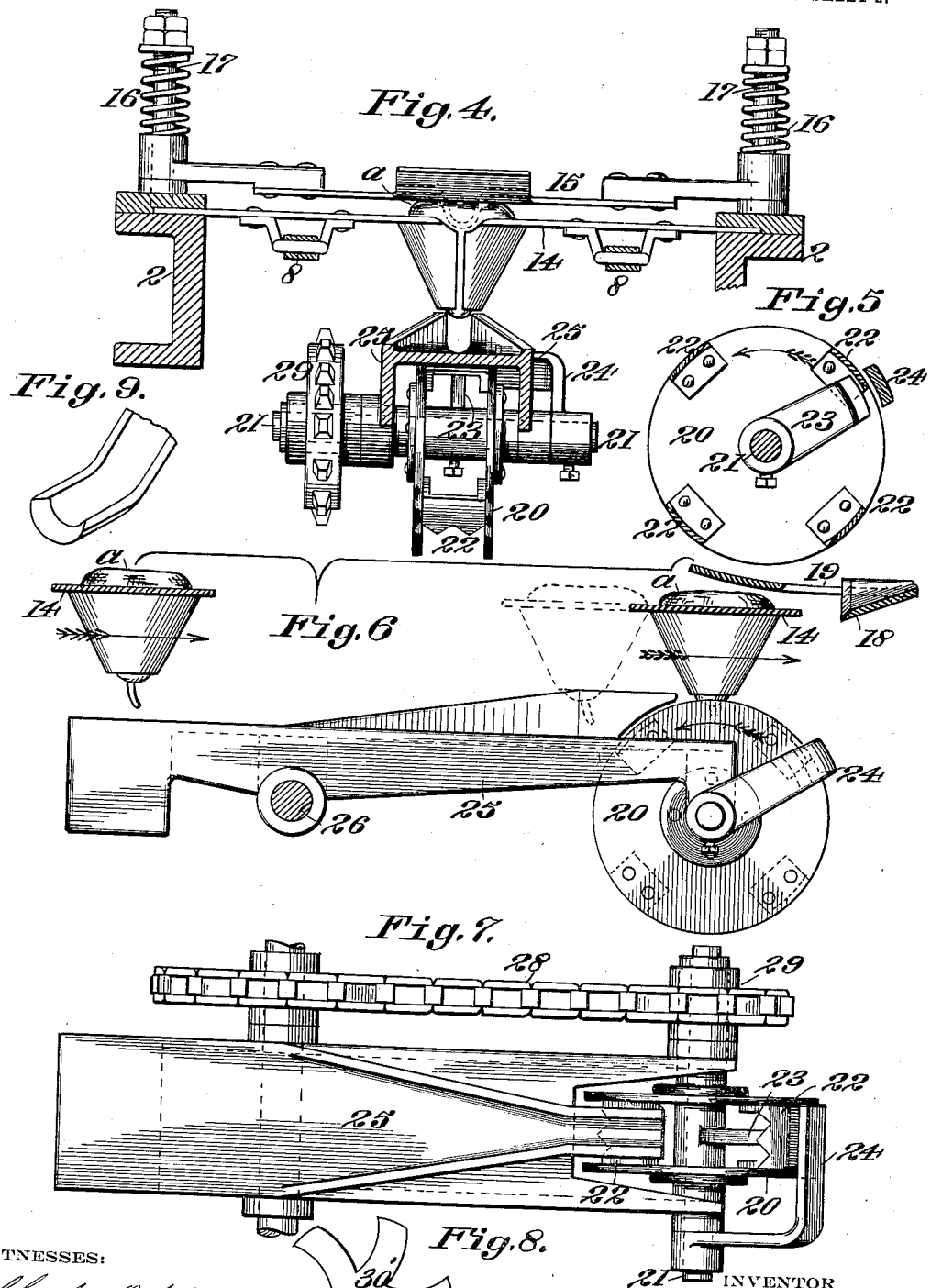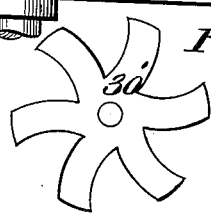

FRANK J. CUNHA, OF HAYWARD, CALIFORNIA.

FRUIT-SLICING MACHINE.

1,102,011. Specification of Letters Patent. Patented June 30, 1914.

Application filed October 14, 1913. Serial No. 795,072.

*To all whom it may concern:*

Be it known that I, FRANK J. CUNHA, a citizen of the United States, residing at Hayward, in the county of Alameda and State of California, have invented new and useful Improvements in Fruit-Slicing Machines, of which the following is a specification.

This invention relates to a machine for slicing, or severing, and removing stems and eyes from fruit or vegetables without stones.

The object of this invention is to provide a slicing machine which will also sever and remove stems and eyes from pears, apples, or other fruit or vegetables having no stones.

It is a further object to provide a machine with automatically adjusting means to operate on fruit, as pears of different size, with means for taking off the stems and making a cut of arbitrarily fixed depth to remove the blossom, pit or eye.

The invention includes a moving conveyer with divided pockets for fruit to be cut, with means for destemming the fruit and means for removing the eye, and a cutter for severing the fruit, and including a driving shaft for operating the machine.

The invention further consists of the parts and the construction and combination of parts as hereinafter more fully described and claimed, having reference to the accompanying drawings, in which,—

Figure 1 is a vertical section on the line x—x of Fig. 2. Fig. 2 is a plan view. Fig. 3 is a detail of a conveyer slat. Fig. 4 is a cross section at the line y—y, Fig. 1. Fig. 5 is a detail of the stem cutter. Fig. 6 is a side view of the stem guide and cutter. Fig. 7 is a plan view of the same. Fig. 8 is a view of a modified slicing wheel. Fig. 9 is a view of a modified gouge.

In the drawings 2 represents a suitable form of frame, in which is journaled a crank or driving shaft 3, driving a sprocket chain 4 and its sprocket 5 on a counter-shaft 6. The counter-shaft 6 carries spaced sprockets 7, each driving parallel belts or chains 8, turning at the opposite end of the frame on idlers 9 on a shaft 10. The sprocket chains are slatted with plates 11, with down-turned ends 12 between which is formed a passageway 13, the slats and chains coöperating to form a floored conveyer centrally divided longitudinally, each half having a uniform speed of travel. At suitable intervals along the conveyer, which is here shown as endless, are socket members or cups formed by plates 14, each formed with semi-conical frustums in opposition, these being designed to receive the fruit to be cut so that the stems are pendent. The cups are preferably of such depth that the small ends of pears, for instance, will project below the bottom open ends of the inverted cone sections, while the upper portions of the pears $a$ will vary in level in the cup according to the size of the pear.

An operator places a pear in a cup while the conveyer is moving, and it is carried forward between opposed yieldable devices, the upper one consisting of a presser plate 15 extending across the conveyer and pressed down by a yieldable resistance shown as springs 16, the plate having vertical movement on guides 17 on the frame. On the presser plate is a gouge 18, projecting down through a slot 19 in the plate, a distance which may be varied arbitrarily, the gouge standing in the passageway 13 and being straddled by the cup sections 14. As a pear traverses the gouge this will remove the eye at the blossom end, the cutting rising to the top of the plate 15.

Opposed to the presser plate and below the conveyer, is a swinging, hollow, rotary cutter head 20, mounted loosely on an axle 21 and having transverse circumferentially spaced blades 22 which revolve in juxtaposition to the bottoms of the cups 14 and snip off the stems of the pears therein. The cutter 20 has spaced side disks between which is secured on the shaft a stripper 23, just cleared by the revolving blades 22, from which stems are removed; another fixed stripper 24 overhanging the outer portions of the cutter and being secured to axle 21. The axle 21 is journaled in a hanger 25, loosely pivoted on a shaft 26 in the frame 2, and geared at 27 to the drive shaft 3. On the shaft 26 is a sprocket wheel driving chain 28, driving sprocket 29 of the cutter 20. Hanger 25 is provided with a counterweight C to lift the cutter toward the pear stem. In operation these opposed yieldable members 16 and 25 will coöperate to embrace a pear between its ends, the upper plate rising when lifted by a large pear passing below in a cup, the pressure of the plate holding the pear firmly while the rotary cutter snips off the stem. The hanger 25 is provided with upper guide walls converging toward the cutter 23, so that the stems will be positively directed toward it.

From the foregoing it will be seen that the gouge can cut only a predetermined depth because it is lifted by the presser plate 15 as the pear passes below, carried in the spaced conical sections of the cups. After the pear passes the cutters 18 and 20 it is carried against a rotary disk slicer 30, located in the passageway 13, and of such diameter as to entirely sever the fruit in the cups, the sections of which are spaced sufficiently to straddle the disk 30. The disk 30 is secured upon a shaft 31, journaled in the frame 2 below the upper plane of the conveyer, and geared at 32 to the counter-shaft 6. While the gouge 18 is shown in Fig. 1 as an embossed plate, in Fig. 9 a modified form is shown as comprising a chisel. In Fig. 8 is shown a toothed slicing wheel 30′.

Having thus described my invention what I claim and desire to secure by Letters Patent, is:

1. A machine having a traveling conveyer with receptacles for fruit to be severed, means for severing the fruit while in the receptacles, and means for removing the stems, said severing and stem removing means being relatively disposed on opposite sides of the conveyer.

2. A machine having a conveyer with receptacle for fruit to be severed, means for severing the fruit while in the receptacles, means for removing the stems, and gouging means for removing the eyes at the blossom end, said stem and gouging means being relatively disposed on opposite sides of the conveyer.

3. A machine having a conveyer with receptacles for fruit to be severed, means for severing the fruit while in the receptacles, means for removing the stems disposed below the conveyer, and gouging means for removing the eyes at the blossom end disposed above the conveyer, said last-named means coöperating to embrace the fruit.

4. A machine having a conveyer with receptacles for fruit to be severed, means adjacent said conveyer for severing the fruit in the receptacles, means above said conveyer for removing the stems while in said receptacles, gouging means for removing the eyes at the blossom end, said last-named means coöperating to embrace the fruit, and yieldable pressure devices acting upon the gouging means.

5. In a fruit slicer, a conveyer comprising a pair of spaced slat-belts with plates coöperating to form receptacles, a rotary cutter operating through the receptacles to sever fruit therein, and a pressure device for holding fruit in the receptacles, said device having a gouge for removing the eye of the blossom end.

6. In a fruit slicer, a conveyer comprising a pair of spaced slat-belts with plates coöperating to form receptacles, a rotary cutter operating through the receptacles to sever fruit therein, a pressure device for holding fruit in the receptacles, said device having a gouge for removing the eye of the blossom end, and a yieldable cutter for removing the stem.

7. In a fruit slicer, a conveyer comprising a pair of spaced slat-belts with plates coöperating to form receptacles, a rotary cutter operating through the receptacles to sever fruit therein, a pressure device for holding fruit in the receptacles, said device having a gouge for removing the eye of the blossom end, and a yieldable cutter for removing the stem, said device and cutter being superposed.

8. In a fruit slicer, a conveyer comprising a pair of spaced slat-belts with plates coöperating to form receptacles, a rotary cutter operating through the receptacles to sever fruit therein, a pressure device for holding fruit in the receptacles, said device having a gouge for removing the eye of the blossom end, a yieldable cutter for removing the stem, said device and cutter being superposed, and a guide for directing the stems toward the cutter.

9. In combination with fruit holding means, eye removing means above said holding means, stemming means below said holding means and means to effect relative movement between the holding means and the eye removing and stemming means.

10. In combination with a traveling fruit holding means, eye removing means located above said holding means so as to be engaged by the fruit during the movement thereof, and means to resiliently mount said means whereby the eye removing means will gouge the fruit to a predetermined depth regardless of the size of the fruit.

11. In combination with a traveling fruit holding means, a stemming means consisting of a pivoted member arranged below said holding means and having means to guide the stem of the fruit into position for cutting, and cutting means coöperating with said member.

12. In combination with a traveling fruit holding means, a stemming means consisting of a pivoted member arranged below said holding means and having means to guide the stem of the fruit into position for cutting, and a rotatable cutter carried by the member and coöperating with the latter.

13. In combination with a traveling fruit holding means, yieldable eye removing means located above said holding means, and yieldable stemming means located below said holding means, each of the eye removing and stemming means being movable away from the holding means by engagement with the fruit.

14. In combination with a traveling fruit holding means, yieldable eye removing means located above the holding means, stemming means below the holding means, and means to effect relative movement between the holding means and the eye and stemming means.

15. In combination with fruit holding means, yieldable stemming means coöperating therewith and movable by engagement with the fruit away from the holding means, and means to effect relative movement between both of said means.

16. In combination with fruit holding means, a pivoted stemming mechanism movable on its pivot by engagement with the fruit away from the holding means and embodying a rotatable cutter, and means to effect relative movement between said mechanism and means.

In testimony whereof I have hereunto set my hand in the presence of two subscribing witnesses.

FRANK J. CUNHA.

Witnesses:
 H. R. ROBINSON,
 J. E. WELSH.